US006981098B2

(12) United States Patent
Degenaro et al.

(10) Patent No.: US 6,981,098 B2
(45) Date of Patent: Dec. 27, 2005

(54) METHODS AND APPARATUS FOR COORDINATING A PLURALITY OF UPDATES TO A CACHE

(75) Inventors: Louis R. Degenaro, White Plains, NY (US); Arun Kwangil Iyengar, Yorktown Heights, NY (US); Thomas A. Mikalsen, Cold Spring, NY (US); Isabelle M. Rouvellou, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 10/136,658

(22) Filed: Apr. 30, 2002

(65) Prior Publication Data
US 2003/0204694 A1 Oct. 30, 2003

(51) Int. Cl.⁷ .......................... G06F 12/00; G06F 15/16
(52) U.S. Cl. ..................... 711/133; 711/144; 711/129; 709/203
(58) Field of Search ....................... 711/144, 133, 129; 709/203

(56) References Cited

U.S. PATENT DOCUMENTS 6,799,251 B1 * 9/2004 Jacobs et al. ............... 711/133

OTHER PUBLICATIONS

J. Challenger et al., "A Scalable System for Consistently Caching Dynamic Web Data," Proceedings of INFOCOM '99, 10 pages.
J. Song et al., "Design Alternatives for Scalable Web Server Accelerators," Proceedings of the 2000 IEEE International Symposium on Performance Analysis of Systems and Software (ISPASS-2000), Austin, Texas, 20 pages, Apr. 2000.

* cited by examiner

Primary Examiner—Reginald G. Bragdon
(74) Attorney, Agent, or Firm—Ryan, Mason & Lewis, LLP

(57) ABSTRACT

Techniques for improved cache management are provided. In particular, the invention provides techniques for improving the task of updating a cache by efficiently and intelligently combining and controlling cache update operations. For example, a technique may comprise the following steps. A set of keys is determined such that at least one key in the set corresponds to an object in an unknown state. Requests to keys in the set are suspended while the cache is being updated. That is, the set of keys is set to an offline status, i.e., not accepting any request for a key in the set. Then, the set is placed back to an online status, i.e., accepting requests for a key in the set, after the update to the cache is complete.

19 Claims, 6 Drawing Sheets

FIG. 3A
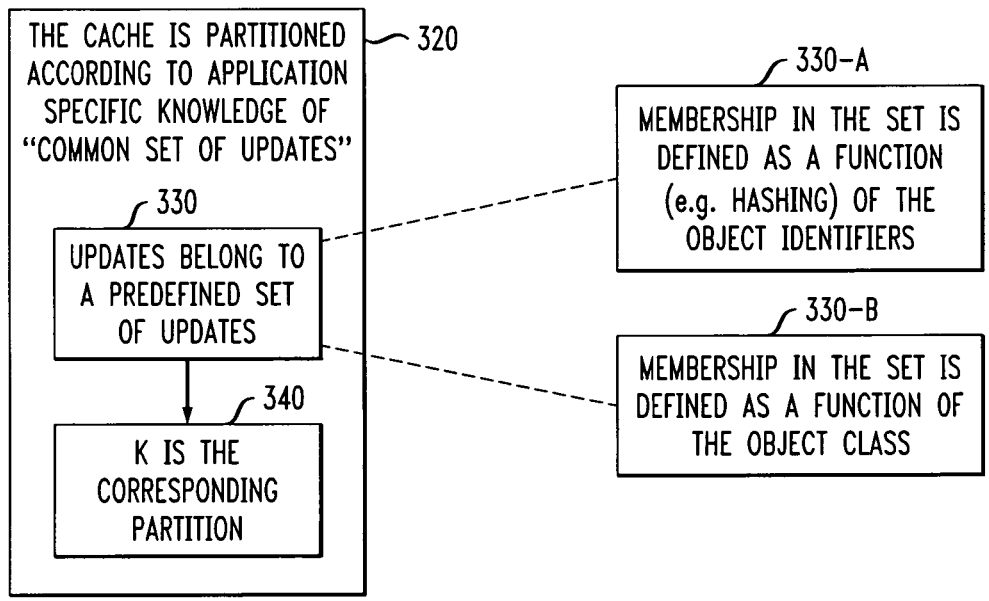
FIG. 3B
FIG. 4
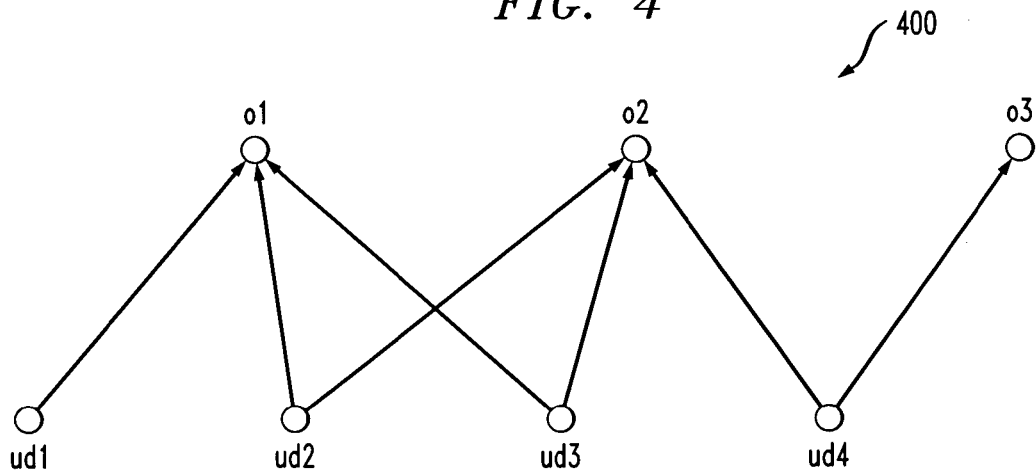

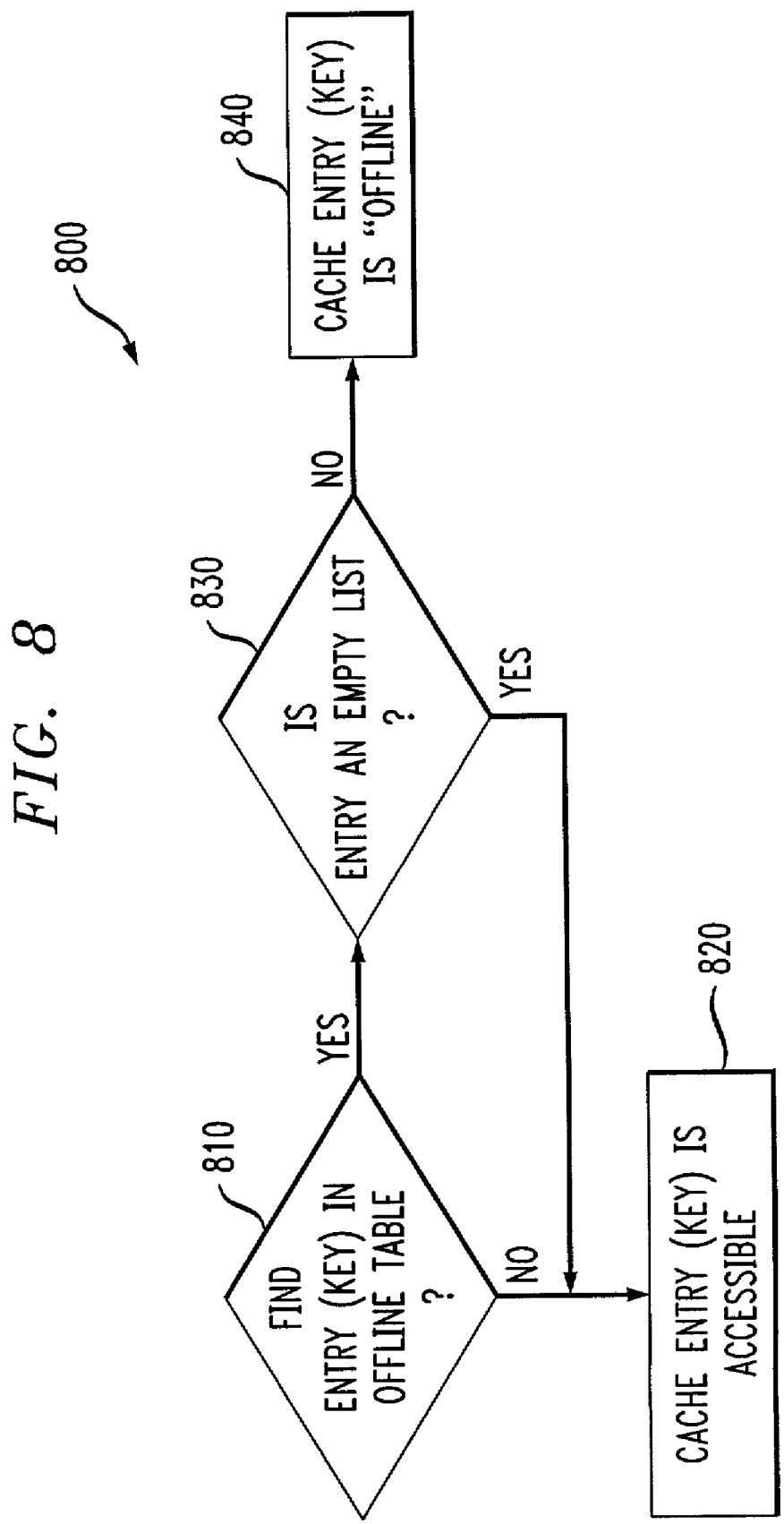

METHODS AND APPARATUS FOR COORDINATING A PLURALITY OF UPDATES TO A CACHE

FIELD OF THE INVENTION

The present invention relates to data storage techniques and, more particularly, to techniques for coordinating update operations associated with a cache.

BACKGROUND OF THE INVENTION

As is known, the term "cache" generally refers to a data storage or memory device, or at least some portion of memory associated with such a device, in which data objects are typically stored for faster access. For example, in a World Wide Web or Internet-based environment, a cache may be used to temporarily store data objects previously retrieved from a Web server such that future access of this data, by the original requester or some other subsequent requesters, may be accomplished via the cache rather than via the Web server again. Such caches are typically called "cache servers" or "proxy caching servers." However, some form of caching may also be done on one or more of the computer systems (i.e., client devices) of the requesters. Some of the well-known advantages associated with the use of a cache in such a computing environment include the realization of a savings in access and/or processing time, as well as a reduction in network traffic.

In many situations, a cache will be updated multiple times by update operations which occur in close temporal proximity to one another. A conventional technique for handling these update operations is to treat them independently. However, this technique typically suffers from poor performance. For example, the same cached object may be invalidated and recalculated multiple times resulting in significant overhead. In some cases, invalidation operations may be expensive. For example, if the cache is single threaded and lock contention is an issue, invalidation operations may add to the contention and further reduce cache throughput.

Further, if the cache is managed using data update propagation (for example, as described in J. Challenger, A. Iyengar and P. Dantzig, "A Scalable System for Consistently Caching Dynamic Web Data," Proceedings of INFOCOM '99, the disclosure of which is incorporated by reference herein) and the update operations are to underlying data, determining cached objects affected by the changes to underlying data requires a graph traversal for each update. In another scenario, the cache may be storing sets of entities. In response to an update message, the cache then has to determine all cached sets affected by the update.

Thus, there is a need for cache management techniques which address these inefficiency and overhead issues, as well as other related issues.

SUMMARY OF THE INVENTION

The present invention provides techniques for improved cache management. In particular, the invention provides techniques for improving the task of updating a cache by efficiently and intelligently combining and controlling cache update operations. The invention is applicable to a broad range of applications including, but not limited to, data storage for the World Wide Web, e.g., cache servers and proxy caching servers. While the invention is particularly applicable to cache-based storage, it can be applied to other forms of data storage as well.

It is assumed that some system (e.g., client device) is sending updates to a cache (e.g., cache server). It is to be understood that the term "update," as used herein, is meant not only to include changing the value of a data object in a cache but also may include invalidating the data object or performing some other operation on the object. When it is determined that a sequence of related update operations in close temporal locality to one another is about to occur, the invention provides for combining at least a portion of the update operations into one or more sets or batches. Then, advantageously, each batch is performed as a single atomic update to the cache. Thus, the client may view the cache contents either in a state before all updates have occurred or after all updates have occurred.

In order for the cache to maintain consistency, the techniques of the invention employ methods for handling requests while the cache is being updated in batches. Thus, in one aspect of the invention, the present invention provides techniques for preventing cache lookups or accesses, which might return stale data, while a set of updates is taking place. This may be accomplished by putting all or part of the cache in a suspended state. When a client contacts the cache, the client device may indicate a maximum time, tmax, which it is willing to wait for a cached object in a suspended state. If the requested object is in a suspended state, an expiration time for the request may be calculated as the current time plus tmax. After the expiration time has elapsed, the request may be treated as a cache miss. Further, an ordered list (e.g., a balanced tree) of expiration times for lookup requests may be maintained. After an expiration time elapses, the request corresponding to the expiration time may be handled as a cache miss.

When a batched update has completed, cached objects may be taken out of a suspended state, and the pending requests can then be satisfied. In some cases, an object in a suspended state is invalidated during the batched update. In other cases, the object is not changed by the batched update. In still other cases, the object is changed (e.g., prefetched) by the batched update.

These and other objects, features and advantages of the present invention will become apparent from the following detailed description of illustrative embodiments thereof, which is to be read in connection with the accompanying drawings.

BRIEF DESCRIPTION OF THE DRAWING

FIGS. 3A and 3B are flow diagrams illustrating methods of determining a set of keys according to embodiments of the present invention;

FIG. 4 is a diagram illustrating a method of determining a set of keys according to another embodiment of the present invention;

FIG. 8 is a flow diagram illustrating a method using an offline table to determine whether a particular entry in a cache is accessible according to an embodiment of the present invention.

DETAILED DESCRIPTION OF PREFERRED EMBODIMENTS

Figure 1:
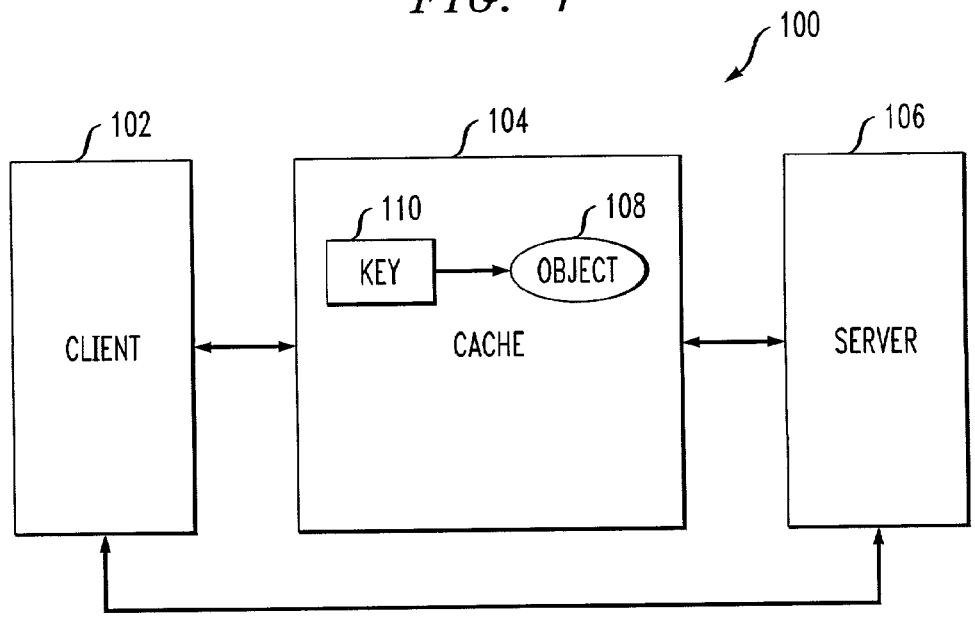
FIG. 1 is a block diagram illustrating an environment in which the invention may operate.

While the present invention will be explained below with occasional reference to an illustrative World Wide Web or Internet-based environment, particularly with respect to data storage associated with a cache server or a proxy caching server, it is to be understood that the present invention is not limited to such a particular environment or application.

Rather, the invention is more generally applicable to any data storage environment or application in which it is desirable to substantially reduce overhead and/or latency associated with updating operations performed in the data storage environment. That is, the techniques of the invention may be applied to any data storage environments such as ones involving disk storage systems or any other persistent memory-based devices such as, for example, ROM (read only memory), fixed memory devices (e.g., hard drive), removable memory devices (e.g., diskette), etc., as well as those involving non-persistent memory-based systems such as, for example, RAM (random access memory), etc.

It is to be understood that, as used herein, the phrase "data object" or "object" is intended to refer to any form of data or information. By way of example only, in the context of the Web, a data object may be some form of Web data such as an HTML (HyperText Markup Language) file, an image file, etc. For example, the data may be objects that are retrieved on the Internet by a server system, or sent to a client computer operatively coupled to a server system via the Internet, in response to a client request. The data may also be objects created at the client's request. However, it is to be understood that the invention is not limited to any particular form of data or information Referring initially to FIG. 1, a block diagram depicts an illustrative environment in which the invention may operate. As shown, a system 100 may comprise a client device 102, a cache 104 and a server 106, all operatively coupled via a network such as the World Wide Web or Internet. In general, the client device 102 obtains information from the server 106. In order to reduce latency and/or overhead for obtaining data from the server, some data may be cached within the cache 104. Obtaining data from the cache 104 generally results in less overhead than obtaining the data from the server 106. The cache maintains a number of objects, such as object 108, each of which are typically identified by a key 110, as will be explained below.

It is to be understood that in the illustrative embodiment of FIG. 1, each of client device 102, cache 104 and server 106 may have its own processor/memory capacity for performing steps associated with its operations. For example, the client device may be any type of computing device (e.g., personal computer, laptop, personal digital assistant, cellular phone, etc.) with which a client may access data from server 106, as well as from other devices or servers to which the client device is coupled. Further, the server 106 may have the processor/memory capabilities of a Web server system. Still further, the cache 104 may have the processor/memory capabilities of a cache server or proxy caching server. Thus, all or portions of the cache updating techniques of the invention may be implemented on the client 102, the cache 104, the server 106 and/or one or more other computing systems coupled to at least one of these processing elements.

It is to be appreciated that the term "processor" as used herein is intended to include any processing device, such as, for example, one that includes a CPU (central processing unit) or other processing circuitry. Also, the term "processor" may refer to one or more individual processors. Accordingly, one or more computer software programs including instructions or code for performing the cache updating methodologies of the invention, as described herein, may be stored in memory associated with the processor (e.g., ROM, fixed or removable memory) and, when ready to be utilized, loaded in part or in whole (e.g., into RAM) and executed by the processor so as to provide one or more of the benefits described herein.

Figure 2:
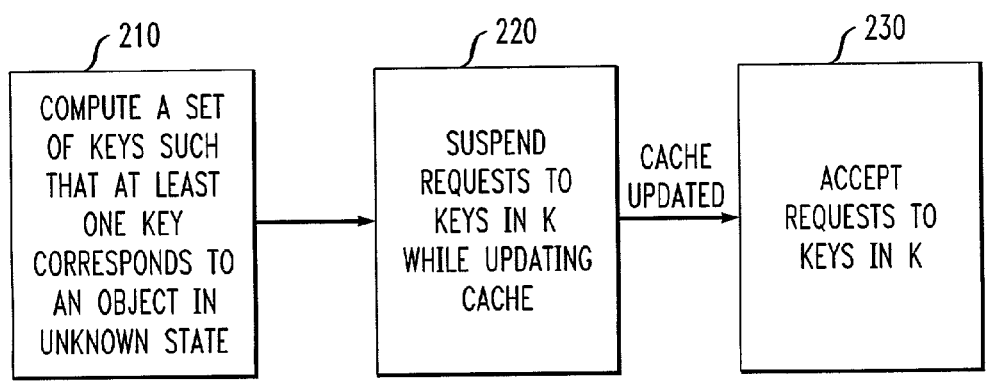
FIG. 2 is a flow diagram generally illustrating a method of managing a cache according to an embodiment of the present invention.

Referring now to FIG. 2, a flow diagram generally depicts a method of managing a cache according to an embodiment of the present invention. While data objects are stored in cache 104, it is to be understood that the steps of the cache management methodology of the invention may be implemented in the client device 102, the cache 104, the server 106, one or more other computing systems, or in combinations of two or more of such processing elements.

As shown, the method 200 comprises the following steps. In step 210, a set K of keys is determined such that at least one key in the set corresponds to an object in an unknown state. A "key" generally refers to an entity for identifying an object, e.g., a string. An example of an "unknown state" may be a state where it is not known whether the cached value of an object is current. It is to be understood that one or more data objects in a cache may be assigned to a specific key, although, there is typically a one-to-one correspondence between an object and a key. Thus, when it is stated that "a set K of keys is determined," it is intended to refer to the process of selecting which objects should be placed in a suspended state.

Also, it is to be understood that step 210 represents an update batching procedure of the invention. That is, when it is determined that a sequence of related update operations in close temporal locality to one another is about to occur, the invention provides for combining at least a portion of the update operations into one or more sets or batches. Then, advantageously, each batch may be performed as a single atomic update to the cache.

In step 220, requests to keys in K are suspended while the cache is being updated. That is, the set K of keys is set to an "offline" status, i.e., not accepting any request for a key in set K. Then in step 230, set K is set back to an "online" status, i.e., accepting requests for a key in set K, after the update to the cache is complete.

Referring now to FIGS. 3A and 3B, flow diagrams depict methods of determining a set K of keys according to embodiments of the present invention. More specifically, FIGS. 3A and 3B illustrate methods for performing step 210 of FIG. 2, i.e., methods of selecting which objects should be placed in a suspended state.

In one embodiment, as shown in block 310 of FIG. 3A, the entire cache may be placed in a suspended state. Therefore, all keys and their corresponding objects in the cache are placed in a suspended or "offline" state.

In another embodiment, partitions for the cache are defined such that one or more partitions are placed in a suspended state. This is illustrated in FIG. 3B in accordance with block 320. Partitions may be defined in multiple ways. In one example, a particular method defines at least one application-specific partition corresponding to objects likely to be updated/invalidated in the same batch. Thus, updates would belong to a predefined set of updates (block 320) and, therefore, K would be the corresponding partition (block

340). In an illustrative case, the membership in a partition may be defined by: (a) a function (e.g., hashing function) of an identifier associated with an object (block 330-A); or (b) a function of a class associated with an object (block 330-B).

It is to be further understood that the partitioning mechanism may be orthogonal to the manner in which keys are associated to entries in the cache.

Referring now to FIG. 4, a diagram depicts a method of determining a set K of keys according to another embodiment of the present invention. In this embodiment, the invention uses an object dependence graph (ODG) to determine K. In this example, ODG 400 includes four data updates (ud1, ud2, ud3 and ud4) and three data objects (o1, o2 and o3) which are the subject of certain of the updates, as shown by the corresponding arrows in FIG. 4. Thus, consider that data updates ud1 and ud2 are to occur. According to ODG 400, it is determined that o1 and o2 must be suspended. Thus, when the update set={ud1, ud2}, the set K={o1, o2}.

Figure 5:
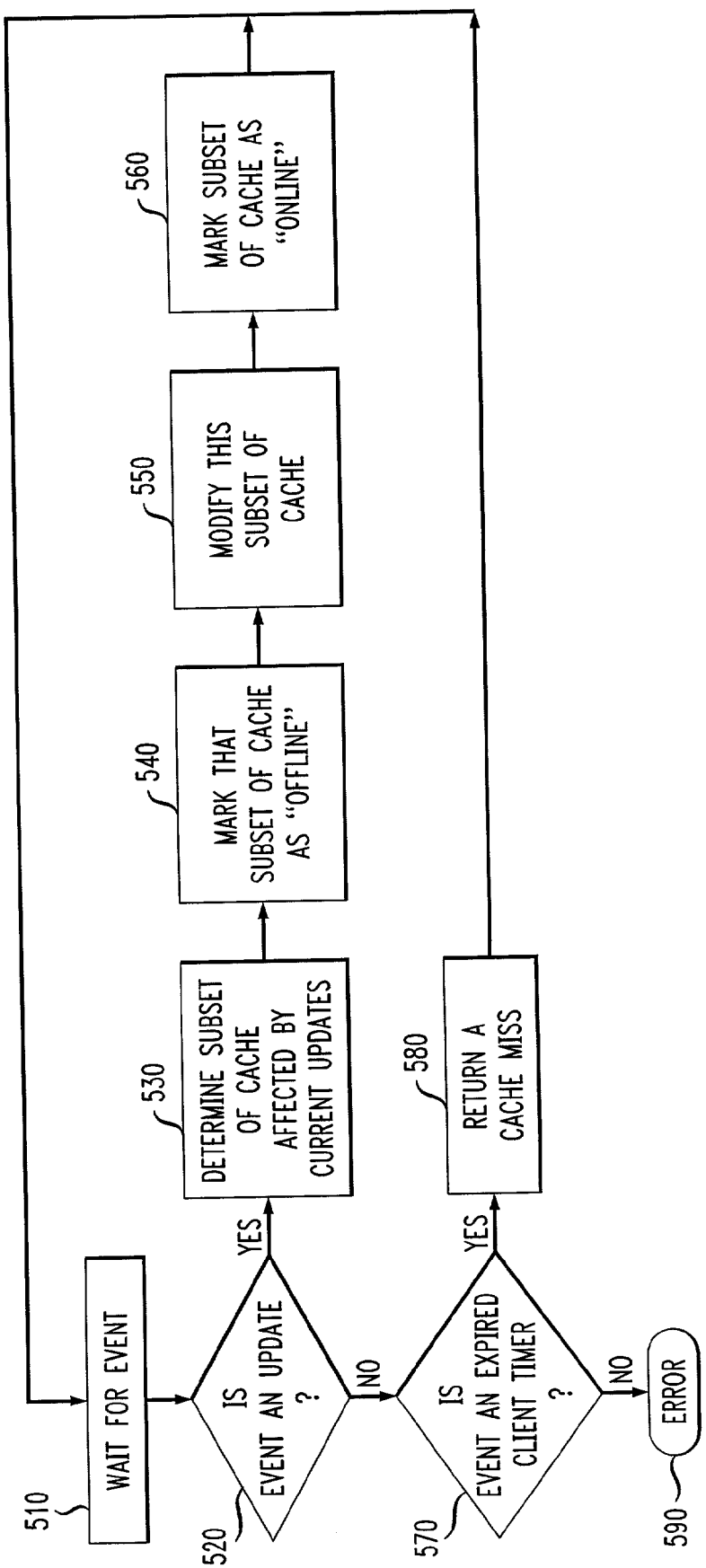
FIG. 5 is a flow diagram more specifically illustrating a method of managing a cache according to an embodiment of the present invention.

Referring now to FIG. 5, a flow diagram more specifically depicts a method 500 of managing a cache according to an embodiment of the present invention. It is to be understood that the steps shown in FIG. 5 may be the steps implemented in an "update module" used to control the update of a cache. As used herein, such an update module may be a processing element or code that performs the methodologies of the invention described herein and resides in the client 102, the cache 104, the server 106, one or more other computing systems, or some combination thereof.

As shown, the update module receives an event in step 510. In step 520, it is determined if the event is an update of some data affecting at least one object in the cache. If so, the update module computes a set K of keys such that at least one of the keys in K corresponds to an object in unknown state. That is, as shown in step 530, the subset of the cache that is affected by the current update is determined.

This set (subset of cache) is marked as, and placed, offline (suspended) in step 540. Then, in step 550, the subset of the cache is modified in accordance with the update. Once the cache is updated, the subset of the cache which was offline is marked as, and placed back, online in step 560. The update module then returns to the step of waiting for the next event (step 510).

If the event is not an update of some data affecting at least one object in the cache (step 520), it is determined whether the event is a client request time-out in step 570. This corresponds to a situation in which a request has been pending for a maximum amount of time acceptable for a client, i.e., tmax. If the event represents the expiration of a client timer, the update module returns a "cache miss" message to the client. In order to detect when a client request has timed out, requests and/or pointers to requests may be stored by the update module in a data structure ordered by expiration times such as a balanced tree or a list. The update module then returns to the step of waiting for the next event (step 510). If the event does not represent the expiration of a client timer, the update module may return an error message in step 590.

Figure 6:
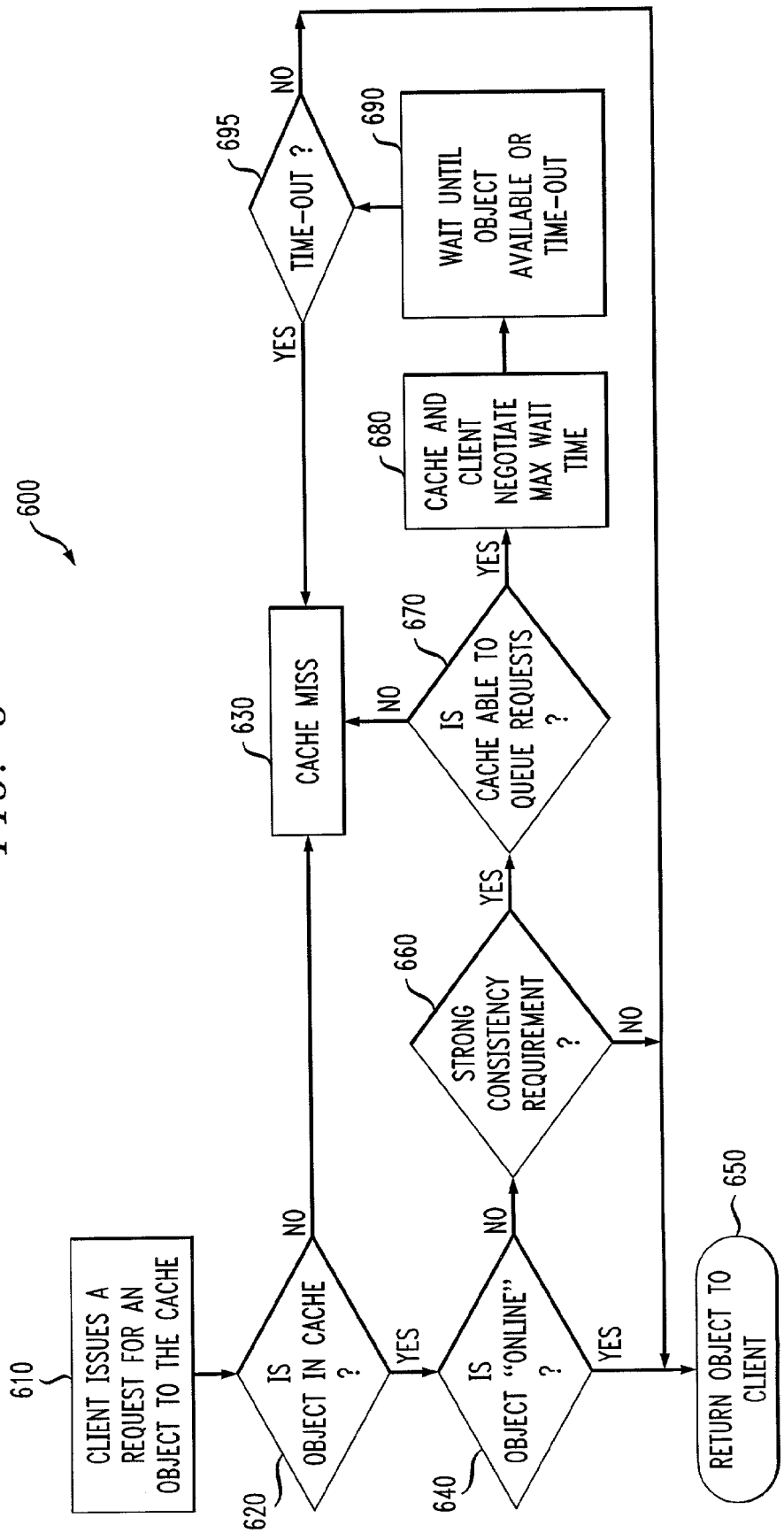
FIG. 6 is a flow diagram illustrating a method of managing a cache according to an embodiment of the present invention from the perspective of the client.

Referring now to FIG. 6, a flow diagram depicts a method 600 of managing a cache according to an embodiment of the present invention from the perspective of the client. Here, it is assumed that the module doing the updating (as described above in accordance with FIG. 5) is implemented in the computing system in which the cache resides, e.g., a cache server. Thus, in the description below of FIG. 6, the update module is generally referred to as the cache.

As shown, in step 610, a client issues an object request to the cache. If the object is not in the cache (step 620), the cache returns a cache miss in step 630. The client then may decide to fetch the object from the server and decide to add it (or not) in the cache. Alternatively, the cache may go to the server and retrieve the object, returning it to the client transparently. The forwarding mechanism may be similar to the one described for a scaleable Web server accelerator in Junehwa Song, Eric Levy, Arun Iyengar and Daniel Dias, "Design Alternatives for Scalable Web Server Accelerators," Proceedings of the 2000 IEEE International Symposium on Performance Analysis of Systems and Software (ISPASS-2000), Austin, Tex., Apr. 2000, the disclosure of which is incorporated by reference herein. The cache may then decide to store or not store the object based on various criteria.

Returning to FIG. 6, if the object is in the cache (step 620), the cache determines whether the object is marked as "online" (not suspended) or "offline" (suspended) in step 640. If the object is online, the object is returned to the client immediately in step 650.

If the object is offline, FIG. 6 depicts a special case of the invention where the client defines (step 660) a level p of desired consistency for the object. The parameter p is sent to the cache with the client request. If p is "weak," e.g., p falls below a predetermined threshold value, then the cache responds with the previous value of the object immediately (step 650).

If p is "strong," e.g., p does not fall below the predetermined threshold value, the client must obtain the latest (updated) value. If the cache is not able to "queue" requests (step 670), a cache miss is returned (step 630) or the cache responds that the object is in a pending state and the client then requests the object directly from the server.

Alternatively, the following may occur:

(i) In response to a requested object being offline, the cache may return a message to the client indicating that the object is offline.

(ii) In response to a requested object being offline, the cache may return a cache miss to a client.

(iii) In response to a requested object being offline, the cache may forward the request for the object to the server. The server may then either respond to the cache which would then forward the object to the client, or the server may respond directly to the client.

(iv) The server is notified of the client request for the object. When the server updates the object in the cache, the server also sends an update message (e.g., via multicast) to the client.

(v) If the cache is able to "queue" requests (step 670), the cache stores a client request along with an expiration time reflecting how long the client is willing to wait to get the updated data from the cache. The cache and the client may negotiate the maximum wait time in step 680. In step 690, the cache waits until the object is available (i.e., after update is complete) or the maximum wait time expires (time-out). If the object is available and the timer has not expired, the object is returned to the client (step 650). If the timer expires (step 695), a cache miss is returned to the client (step 630). As previously mentioned, in order to detect when a client request has timed out, requests and/or pointers to requests may be stored in a data structure ordered by expiration times such as a balanced tree or a list.

Figure 7:
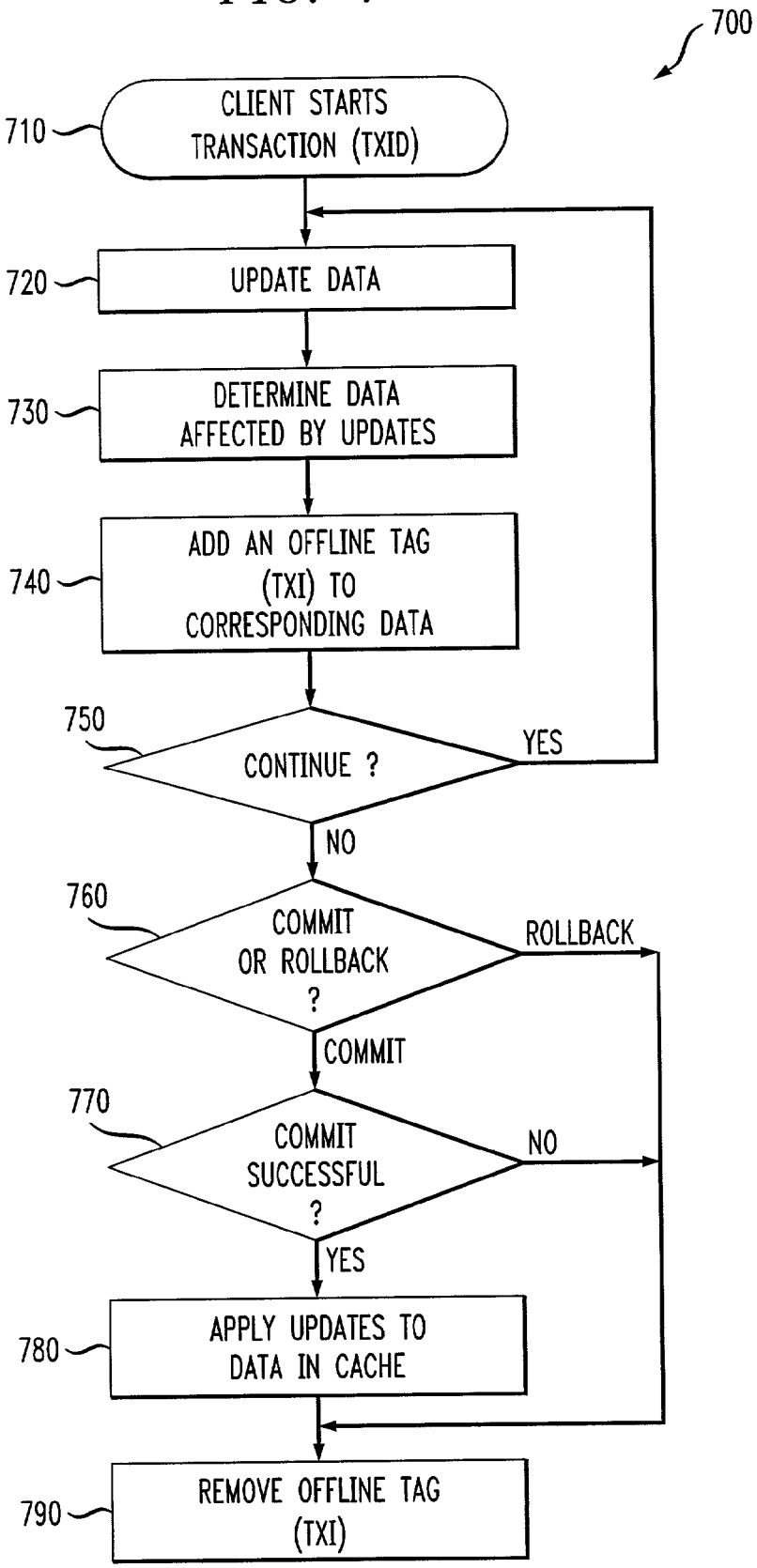
FIG. 7 is a flow diagram illustrating a transaction-based cache update method according to an embodiment of the present invention.

Referring now to FIGS. 7 and 8, a particular embodiment of the invention is illustratively depicted where updates to cache data are done within a transaction.

As shown in the flow diagram of FIG. 7, a transaction-based cache update method 700 begins with a client starting a transaction, Txid, in step 710. When the client updates the data in step 720, the update module (e.g., cache server) computes the affected entries in the cache in step 730. In step 740, the update module then adds or modifies the corresponding entry in an offline table, in effect, creating an offline tag (e.g., txi) associated to the cache entry and the particular transaction Txid. This process continues (through step 750) for each data object affected by the update such that offline tags are created associated to the cache entries and the particular transaction. A structural example of an entry in the offline table may be: <KEY, Txi →Txj → Txk . . . >, where KEY is the key and Txi, Txj, Txk, . . . represent the transactions.

If the client decides to rollback (step 760), the entries in the offline table are deleted. If the client decides to commit (step 760), two outcomes are possible:

(i) The commit is not successful (the transaction rollbacks) as determined in step 770, then the client removes its tags in step 790.

(ii) The commit is successful, as determined in step 770, then the client updates the cache entries in step 780 and removes its tags in step 790.

As is known, the term "commit" typically refers to the process of making a transaction's updates and messages visible to other transactions, while the term "rollback" typically refers to the process of completely undoing or partially undoing the effects of a transaction.

FIG. 8 depicts a flow diagram of an illustrative method 800 of the invention using the offline table to determine whether a particular entry in the cache is accessible.

Given an entry in the cache with a key, k1, the update module (e.g., cache server) determines whether there is an entry with the same key in the offline table, in step 810. If there is no entry, the object (or cache entry or key) in the cache is accessible (block 820). Else, in step 830, the update module determines whether the entry is an empty list. If it is, the object in the cache is accessible (block 820), else the entry is offline (block 840). By putting the entry offline (pessimistic assumption), we can avoid breaking transactional semantics.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of managing a cache having one or more data objects stored therein, the method comprising the steps of:
   determining a set comprising at least one key for which a current value of a data object associated with the at least one key is unknown;
   suspending at least one request corresponding to the at least one key in the set while the cache is updated in accordance with one or more updates; and
   a client providing a time value indicating how long the client is willing to wait for a data object in a suspended state.

2. The method of claim 1, further comprising the step of responding to the at least one request in response to completion of the one or more updates.

3. The method of claim 1, further comprising the step of responding to at least one request that is not suspended.

4. The method of claim 1, further comprising the step of, in response to a request being delayed longer than the time value, returning a cache miss message to the client.

5. The method of claim 1, wherein a request is suspended due to at least one transaction.

6. A method of managing a cache having one or more data objects stored therein, the method comprising the steps of:
   determining a set comprising at least one key for which a current value of a data object associated with the at least one key is unknown;
   suspending at least one request corresponding to the at least one key in the set while the cache is updated in accordance with one or more updates; and
   a client sending a parameter with a request indicating a desired level of data consistency.

7. The method of claim 6, further comprising the step of, in response to the parameter falling below a predetermined threshold value for a request to an object in a suspended state, returning to the client a value from the cache for a requested data object while the object is still suspended.

8. Apparatus for managing a cache having one or more data objects stored therein, the apparatus comprising:
   at least one processor operative to: (i) determine a set comprising at least one key for which a current value of a data object associated with the at least one key is unknown; and (ii) suspend at least one request corresponding to the at least one key in the set while the cache is updated in accordance with one or more updates; and
   memory, operatively coupled to the at least one processor, for storing at least a portion of results of one or more operations performed by the at least one processor;
   wherein the at least one processor is further operative to obtain, from a client, a time value indicating how long the client is willing to wait for a data object in a suspended state.

9. The apparatus of claim 8, wherein the at least one processor is further operative to respond to the at least one request in response to completion of the one or more updates.

10. The apparatus of claim 8, wherein the at least one processor is further operative to respond to at least one request that is not suspended.

11. The apparatus of claim 8, wherein the at least one processor is further operative to, in response to a request being delayed longer than the time value, return a cache miss message to the client.

12. Apparatus for managing a cache having one or mare data objects stored therein, the apparatus comprising:
   at least one processor operative to: (i) determine a set comprising at least one key for which a current value of a data object associated with the at least one key is unknown; and (ii) suspend at least one request corresponding to the at least one key in the set while the cache is updated in accordance with one or more updates; and
   memory, operatively coupled to the at least one processor, for storing at least a portion of results of one or more operations performed by the at least one processor;
   wherein the at least one processor is further operative to obtain, from a client, a parameter with a request indicating a desired level of data consistency.

13. The apparatus of claim 12, wherein the at least one processor is further operative to, in response to the parameter falling below a predetermined threshold value for a request to an object in a suspended state, return to the client a value from the cache for a requested data object while the object is still suspended.

14. A method of managing a cache having one or more data objects store therein, the method comprising the steps of:
- determining at least one partition of the cache for which a current value of at least one data object associated with the at least one partition is unknown; and
- suspending at least one request corresponding to the at least one partition while the cache is updated in accordance with one or more updates;
- wherein the at least one partition is determined using a hash function applied to an identifier associated with a data object.

15. A method of managing a cache having one or more data objects stored therein, the method comprising the steps of:
- determining at least one partition of the cache for which a current value of at least one data object associated with the at least one partition is unknown; and
- suspending at least one request corresponding to the at least one partition while the cache is updated in accordance with one or more updates;
- wherein the at least one partition is determined using an object dependence graph.

16. A method of managing a cache having one or more data objects stored therein, the method comprising the steps of:
- determining at least one partition of the cache for which a current value of at least one data object associated with the at least one partition is unknown; and
- suspending at least one request corresponding to the at least one partition while the cache is undated in accordance with one or more updates;
- wherein the current value of the at least one data object is unknown due to at least one transaction.

17. A method of managing a cache having one or more data objects stored therein, the method comprising the steps of:
- determining at least one partition of the cache for which a current value of at least one data object associated with the at least one partition is unknown; and
- suspending at least one request corresponding to the at least one partition while the cache is undated in accordance with one or more updates;
- wherein a request to the at least one partition is resumed due to a rollback of at least one transaction.

18. A method of managing a cache having one or more data objects stored therein, the method comprising the steps of:
- determining at least one partition of the cache for which a current value of at least one data object associated with the at least one partition is unknown; and
- suspending at least one request corresponding to the at least one partition while the cache is updated in accordance with one or more updates;
- wherein the cache is updated due to a commit of at least one transaction.

19. A method of managing a cache having one or more data objects stored therein, the method comprising the steps of:
- determining at least one partition of the cache for which a current value of at least one data object associated with the at least one partition is unknown; and
- suspending at least one request corresponding to the at least one partition while the cache is updated in accordance with one or more updates;
- wherein a request to the at least one partition is suspended due to at least one transaction.

* * * * *

UNITED STATES PATENT AND TRADEMARK OFFICE
CERTIFICATE OF CORRECTION

PATENT NO. : 6,981,098 B2  
DATED : December 27, 2005  
INVENTOR(S) : L.R. Degenaro et al.

It is certified that error appears in the above-identified patent and that said Letters Patent is hereby corrected as shown below:

Column 9,  
Line 33, delete "undated" and insert -- updated --.

Column 10,  
Line 8, delete "undated" and insert -- updated --.  
Line 23, delete claim 19.

Signed and Sealed this

Second Day of May, 2006

JON W. DUDAS  
*Director of the United States Patent and Trademark Office*